June 6, 1967  S. V. BENISCHEK  3,323,569
JOWL SQUARE CUTTER AND BRANDER
Filed June 25, 1964  2 Sheets-Sheet 1

INVENTOR.
STAN V. BENISCHEK
BY John M Nolan
ATTORNEY

June 6, 1967  S. V. BENISCHEK  3,323,569
JOWL SQUARE CUTTER AND BRANDER
Filed June 25, 1964  2 Sheets-Sheet 2

INVENTOR.
STAN V. BENISCHEK
BY John M Nolan
ATTORNEY

United States Patent Office 3,323,569
Patented June 6, 1967

3,323,569
JOWL SQUARE CUTTER AND BRANDER
Stan V. Benischek, 1551 Northlawn Road,
Davenport, Iowa 52804
Filed June 25, 1964, Ser. No. 378,006
9 Claims. (Cl. 146—160)

This invention relates to a pork jowl square cutter and brander and more particularly to a machine for cutting the usable bacon portion from the whole pork jowl in uniform squares and brading the bacon square with the United States Department of Agriculture inspection brand in the same operation.

In the mass production of pork in the meat packing industry, the hog is systematically cut up. In one of such operations the jowls of the hog are removed from each side of the hog. After removal the jowl is roughly in the shape of a semi-circular, approximately twelve inches in diameter and two inches thick in the middle, tapering toward the rounded side. Since the jowl is quite thin at its rounded edge, only the middle section, adjacent to the flat side, is usable as meat, said meat being principally sold as jowl bacon squares. Accordingly, a square is cut from the middle of the jowl, the remainder of the jowl being used for various purposes along with other meat scraps. Presently, the square is cut manually, the meat cutter making three cuts through the jowl with a knife, one cut parallel to and approximately four inches from the flat edge of the jowl and two cuts perpendicular to the first cut, approximately four inches apart. This results in a piece of meat approximately four inches square, which piece is then manually branded with a USDA stamp. Since the cuts are manually made, the squares are not of uniform size, which makes them unadaptable for many automatic packaging machines. In addition, the three cutting operations and the separate branding increase production time.

The present invention overcomes these objections by utilizing a machine which will make the three necessary cuts simultaneously and brand the product in the same operation.

Accordingly, an object of the present invention is to provide a machine that will cut out the usable portion of a pork jowl in one operation.

Another object of the present invention is to provide a machine that will automatically brand a pork jowl square while it is being cut.

Another object of the present invention is to provide a machine that will cut uniform sections from a pork jowl.

A further object is to provide a machine easily adaptable for manual or automatic operation for uniformly cutting and branding sections from a pork jowl.

Another object of the present invention is to provide a machine for cutting sections from a pork jowl easily adapted to assembly-line techniques and having a cutting board from which the removed scraps will automatically fall onto a conveyor belt.

Another object of the present invention is to provide a machine for branding sections from a pork jowl in which the USDA branding stamp is easily removable for safekeeping.

Still another object of the present invention is to provide a machine for cutting and branding sections from a pork jowl that has a simple but rugged construction, inexpensive to manufacture and maintain.

Other objects and advantages of the invention will appear more fully from a consideration of the detailed description which follows and the accompanying drawings wherein an embodiment of the invention is illustrated. It is to be expressly understood that the drawings are for the purpose of illustration only and are not to be construed as defining the limits of the invention.

Figure 2:
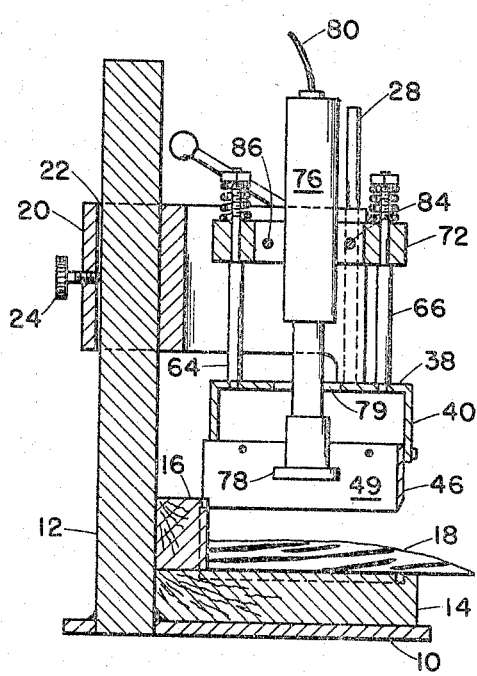
FIGURE 2 is a section view taken along line 2—2 of FIGURE 1.

Referring now to the drawings, there is shown a horizontal stand 10 supporting a vertical shaft 12. A horizontal cutting board 14 rests on the stand 10 and a back board 16 rests on the cutting board 14 adjacent and transverse to shaft 12. An uncut pork jowl 18 is horizontally semicicular in shape, flat on the bottom side, the top tapering toward the rounded edge. The jowl is horizontally placed on the cutting board 14 with its flat surface on the cutting board 14 and the straight edge flush against the back board. A carriage 20 has a vertical bore 22 slightly larger than shaft 12 and is slidably mounted thereon, being locked at any desired height by means of locking screw 24.

The carriage 20 has a second vertical cylindrical bore 26 at the opposite end from bore 22. A piston 28 is slidably mounted in the bore 26, downward motion being imparted to piston 28 by well known rack and pinion means within a gear housing 30 on carriage 20, the rack being driven through a counterclockwise rotation of a shaft 32 by means of a lever 34.

Figure 1:
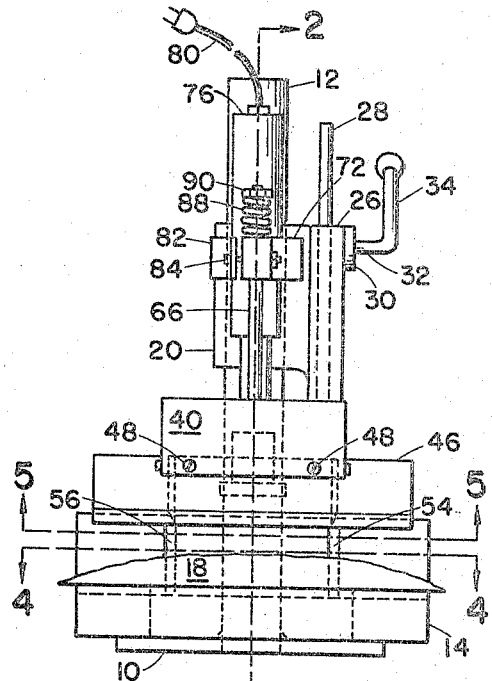
FIGURE 1 is a front elevation view of the jowl square cutter and brander, showing an uncut pork jowl.
Figure 3:
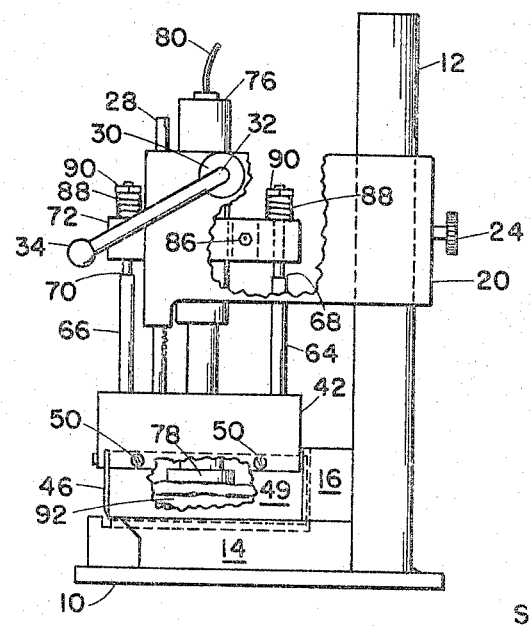
FIGURE 3 is a side view of the jowl square cutter immediately after completing a cut.
Figure 4:
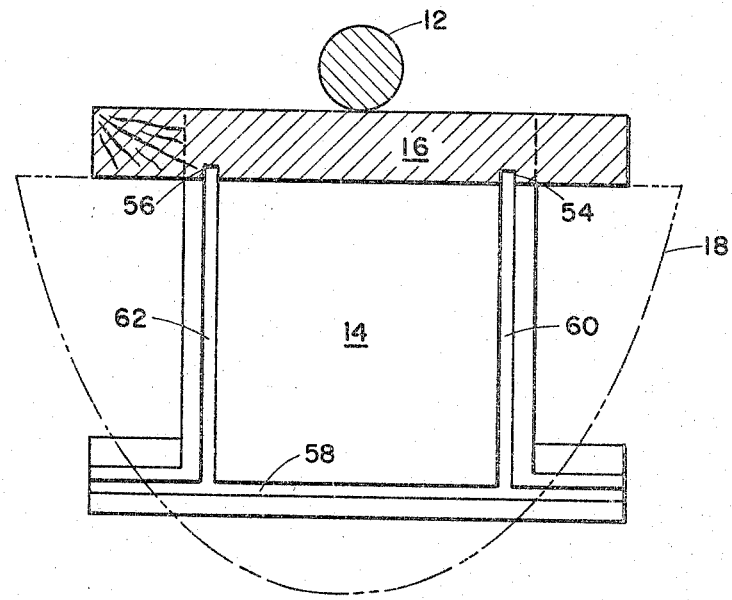
FIGURE 4 is a section view showing the cutting board, taken along line 4—4 of FIGURE 1, a typical uncut pork jowl being shown in dotted lines.
Figure 5:
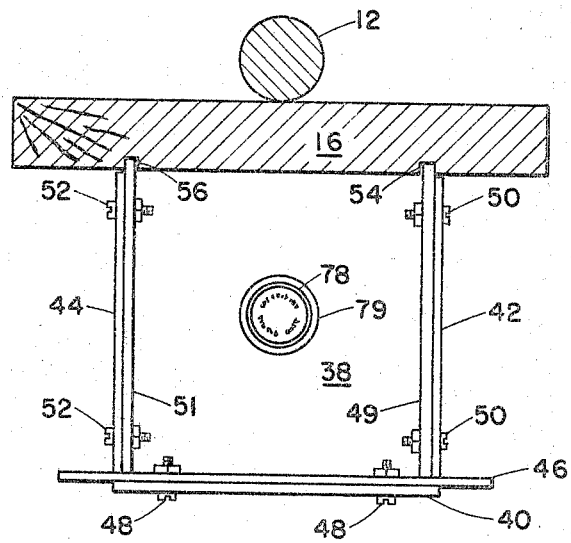
FIGURE 5 is a section view showing the structure of the knives and brading face, taken along line 5—5 of FIGURE 1.

A blade housing is comprised of a horizontal member 38, which is approximately square, a front member 40, a side member 42, and an opposite side member 44, the front and side members extending vertically downward from the edges of horizontal member 38, each member also being affixed to the adjacent members and forming a box open to the bottom and to the rear. The horizontal member 38 is affixed to the lower end of piston 28, and seats against carriage 20, the rack and pinion means containing biasing means which tend to hold the blade housing against the carriage 20 in "rest" position as shown in FIGURES 1 and 2. FIGURE 3 shows the blade housing in "cut" position, the piston 28 being forced downward by rotation of lever 34.

The blade housing carries three vertical blades. A front blade 46 is affixed at its upper edge to front member 40 by means of fasteners 48, said front blade extending beyond front member 40 at both ends. A side blade 49 is affixed at its upper edge to the side member 42 by means of fasteners 50 and another side blade 51 is affixed at its upper edge to side member 44 by means of fasteners 52. The lower edges of blades 46, 49 and 51 are sharpened and lie in the same horizontal plane. The rear edges of side blades 49 and 51 are slidably mounted in grooves 54 and 56 respectively in the back board 16. When the blades are in "cut" position, as shown in FIGURE 3, the lower edge of front blade 46 fits into a front groove 58 on the cutting board 14, and the lower edges of the side blades 49 and 51 fit into side grooves 60 and 62 respectively on the cutting board.

Cylindrical rods 64 and 66 project vertically from the top of horizontal member 38, said rods reducing to a smaller diameter at the same distance from horizontal member 38, forming shoulders 68 and 70 respectively. A yoke 72 has parallel bores at each end slightly larger than the smaller diameters of the rods 64 and 66, which are slidably mounted in said bores, the yoke seating on the shoulders 68 and 70. The upper ends of rods 64 and 66 are threaded. A spring is mounted on each rod 64 and 66 and seats on yoke 72, each spring being retained by a nut 90 on the threaded portion of each rod. The amount of spring tension biasing yoke 72 against shoulders 68 and 70 can be varied by threading nuts 90 up or down along the rods.

A brander is comprised of a handle 76, a stamp 78, and a cord 80 which supplies electric power to the heating element in the stamp. A removable clamp 82 fits around handle 76. Screws 84 and 86 are inserted through the clamp 82 and threaded into yoke 72 on each side of the handle 76, clamping the handle to the yoke. The brander can be easily removed when not in use by merely loosening screws 84 and 86.

To operate the jowl square cutter and brander the uncut pork jowl 18 is placed on the cutting board in the manner previously described. In mass production facilities, the jowls move down a conveyor and are lifted onto the cutting board, which is advantageously mounted above the conveyor. By rotating lever 34 to the position shown in FIGURE 3, the blades are forced through the pork jowl into their respective grooves on the cutting board, the front blade 46 severing the entire front edge portion of pork jowl 18, the severed portion falling off the cutting board back onto the conveyor since there is insufficient cutting board area between the front groove 58 and the front edge of the board to support the severed portion. The side blades each sever a side portion of the pork jowl, the severed portions also falling onto the conveyor, since there is also insufficient cutting board area between the side grooves 60 and 62 and the side edges of the board to support the severed portions. The usable portion of the jowl remains on the cutting board as bacon square 92 as shown in FIGURE 3.

During the cutting stroke, the stamp 78 contacts the top surface of the bacon square 92. After the contact is made, the blades are forced the remainder of the distance through the jowl while the brander seats on the bacon square and remains stationary. Since rods 64 and 66 are moving downward relative to the brander, yoke 72 leaves the shoulders 68 and 70, and moves against the springs 88 which then exert a downward force on the yoke and the brander, pressing the stamp against the bacon square as shown in FIGURE 3. By moving nuts 90 up on down on the threaded rods, thereby adjusting the spring compression, the desired amount of stamp pressure can be obtained for proper branding.

The machine is held in this position by the operator holding lever 34, thereby regulating the time the stamp is held against the bacon square. However, the period could easily be automatically timed for uniform branding. As the lever handle is released, the spring biased brander pushes against the bacon square, ejecting it from blade cavity, until yoke 72 again seats on the rod shoulders.

While the jowl square cutter and brander is of the construction shown and described, it is understood that the invention is not limited to any particular form. Additions and modifications in the invention may be made by those skilled in the art without departing from the scope of the instant invention. Moreover, the use of certain vertical and horizontal positions used to describe the invention should not be construed as limiting the scope of the invention.

I claim:

1. A food cutting and stamping device comprising: a vertical frame; a horizontal support member affixed to the frame and having a vertical bore; a plunger mounted for vertical reciprocation in said bore; a carriage mounted on the lower end of the plunger; a blade having a horizontal generally U-shaped edge forming an approximate square open on one side and depending from the carriage; a horizontal cutting board positioned beneath and adapted to receive said blade edge; a vertical member extending upwardly from the cutting board in substantially the same vertical plane as the open side of the blade; a stamping means mounted on the carriage and having a horizontal stamp positioned within and above the blade edge; means for biasing the plunger upwardly; and means associated with the plunger for moving the plunger downwardly and forcing the blade edge against the cutting board, wherein a pair of parallel rods rise vertically from said carriage, a yoke is vertically reciprocatively mounted on said rods, and said stamping means include a vertical handle being detachably and vertically adjustably affixed to said yoke, the stamping means moving vertically upwardly relative to said carriage when the downward movement of the stamp is impeded, the yoke sliding upwardly on said rods.

2. The invention claimed in claim 1 wherein each rod has a shoulder, the yoke seating thereon, and adjustable spring means for biasing said yoke downward against said shoulder.

3. The invention claimed in claim 2 wherein said blade has a first member and a second and third parallel members of equal length extending transversely from said first member between its end in the same direction, forming a horizontal blade edge in the shape of laterally adjacent T's, the area between the legs of the T's being approximately square.

4. The invention claimed in claim 3 wherein said cutting board has relatively shallow grooves adaptable to receive said blade edges, said grooves being relatively close to the edges of said board.

5. The invention claimed in claim 4 wherein said horizontal support member is affixed to said frame in a vertically adjustable manner.

6. The invention claimed in claim 5 wherein said stamping means is an electrically heated brander.

7. A food cutting device comprising: a vertical frame, including a rigid horizontal member; a vertically reciprocatable plunger guided by said horizontal member; a blade carried by the plunger and having a generally U-shaped horizontal edge; a horizontal cutting board positioned below and adapted to receive the blade edge; a vertical member extending vertically from the cutting board and extending across the open end of the blade when the blade is against the cutting board; and means operatively associated with the blade and plunger for vertically moving the blade against and away from the cutter board.

8. The invention defined in claim 7 wherein the generally U-shaped blade edge has a bight portion and opposite leg portions extending transversely from the bight portion intermediate the opposite ends of the bight portion, the length of the leg portions and the bight portion between the leg portions being approximately equal, the blade and the vertical member conjunctively enclosing an approximate square.

9. A food cutting and stamping device comprising: a vertical frame including a horizontal member; a vertically reciprocatable plunger guided by the horizontal member; a blade having a generally U-shaped horizontal cutting edge carried by the plunger; a horizontal cutting board positioned below and adapted to receive the blade edge; a stamping means carried by the plunger and having a horizontal stamp positioned above and between the opposite legs of the blade edge; and means operatively associated with the plunger for vertically reciprocating the stamp means and blade.

References Cited

UNITED STATES PATENTS

| 201,915 | 4/1878 | Dick et al. | 146—160 |
| 2,153,067 | 4/1939 | Alltimes | 107—68 |
| 2,200,270 | 5/1940 | Flores | 107—68 X |
| 2,589,908 | 3/1952 | Weidenmiller | 107—68 |
| 2,713,879 | 7/1955 | Bogdanovich | 146—155 X |

WILLIAM W. DYER, Jr., *Primary Examiner.*

W. GRAYDON ABERCROMBIE, *Examiner.*